United States Patent
Simon et al.

(10) Patent No.: US 7,787,427 B1
(45) Date of Patent: Aug. 31, 2010

(54) PROVIDING LOW AVERAGE LATENCY COMMUNICATION IN WIRELESS MESH NETWORKS

(75) Inventors: Jonathan Simon, Castro Valley, CA (US); Lance R. Doherty, Berkeley, CA (US)

(73) Assignee: Dust Networks, Inc., Hayward, CA (US)

( * ) Notice: Subject to any disclaimer, the term of this patent is extended or adjusted under 35 U.S.C. 154(b) by 427 days.

(21) Appl. No.: 11/651,921

(22) Filed: Jan. 9, 2007

(51) Int. Cl.
*H04W 4/00* (2009.01)
(52) U.S. Cl. ........................ 370/338; 370/314
(58) Field of Classification Search ............... 370/328, 370/280, 335, 351, 235, 338, 238, 349, 314, 370/437; 455/445
See application file for complete search history.

(56) References Cited

U.S. PATENT DOCUMENTS

| | | | |
|---|---|---|---|
| 6,522,635 B1 * | 2/2003 | Bedwell | 370/314 |
| 7,233,574 B2 * | 6/2007 | Worfolk et al. | 370/238 |
| 7,420,952 B2 * | 9/2008 | da Costa et al. | 370/338 |
| 7,486,693 B2 * | 2/2009 | Walter et al. | 370/437 |
| 2004/0032847 A1 * | 2/2004 | Cain | 370/338 |
| 2006/0002368 A1 * | 1/2006 | Budampati et al. | 370/351 |
| 2006/0193285 A1 * | 8/2006 | Roy et al. | 370/328 |
| 2007/0002804 A1 * | 1/2007 | Xiong et al. | 370/335 |
| 2007/0002821 A1 * | 1/2007 | Carlson et al. | 370/349 |
| 2007/0066315 A1 * | 3/2007 | Kado | 455/445 |
| 2007/0297388 A1 * | 12/2007 | Appaji et al. | 370/351 |
| 2008/0144500 A1 * | 6/2008 | Chen et al. | 370/235 |
| 2009/0046606 A1 * | 2/2009 | Wan et al. | 370/280 |

* cited by examiner

*Primary Examiner*—Kwang B Yao
*Assistant Examiner*—Syed Bokhari
(74) *Attorney, Agent, or Firm*—Van Pelt, Yi & James LLP

(57) ABSTRACT

Communicating using a wireless mesh network is disclosed. A route is determined from a first node to each other node in the wireless mesh network including one or more intermediate nodes that receive and transmit the packet. A frame length used for communicating a packet is selected based on the routes from the first node to each other node in the wireless mesh network. Node to node communications are selected within the frame along the route such that a predetermined average communication latency time is achieved.

19 Claims, 10 Drawing Sheets

PROVIDING LOW AVERAGE LATENCY COMMUNICATION IN WIRELESS MESH NETWORKS

BACKGROUND OF THE INVENTION

Communication between nodes in a wireless mesh network is described by routes from one node to another. Within a network, a frame is used to describe the time sequence used for communication between the nodes. Node to node selection within a frame is somewhat arbitrary and needs only to select a sequence of transmissions and receptions that enable communication between a desired source node and destination node. However, in some cases there is a quality of service that is desired—for example, a packet should travel from a source node to a destination node in a certain amount of time. It would be beneficial to be able to specify wireless mesh network communications that consider quality of service constraints.

BRIEF DESCRIPTION OF THE DRAWINGS

Various embodiments of the invention are disclosed in the following detailed description and the accompanying drawings.

DETAILED DESCRIPTION

Figure 1:
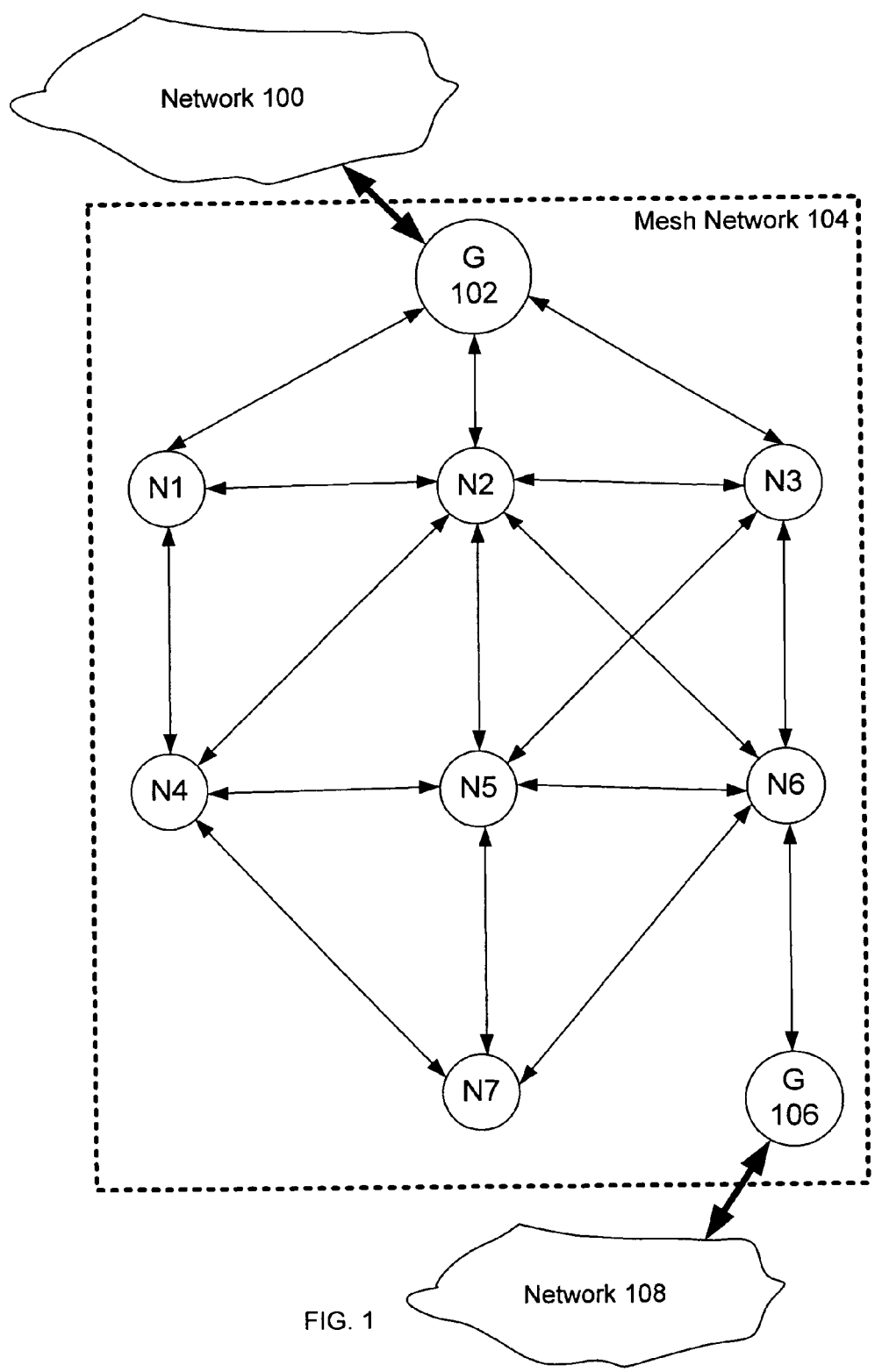
FIG. 1 is a block diagram illustrating an embodiment of a mesh network.

The invention can be implemented in numerous ways, including as a process, an apparatus, a system, a composition of matter, a computer program product being embodied in a computer readable medium comprising computer instructions, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Communicating using a mesh network is disclosed. Routes from a source node to all other nodes in the mesh network are determined. The length of the routes is used to determine a frame length. For low average latency, a frame that enables communication from a source node to a destination node by transmitting and receiving a packet from the source node, through intermediate nodes, to the destination node is used. Latency can exceed one frame because if a transmission or reception fails, then the packet may need to wait until the next frame to get to the destination node. For a low average latency, but with some tolerance for failure, the frame can accommodate additional transmission/reception between nodes that have lower stability. Stability is a measure of the number of successful transmissions/receptions given a number of attempted transmissions/receptions. The repetition of the transmission/reception can be done in the event of a prior failure within the frame thus still achieving packet transmission from source to destination node, but if a transmission/ reception is successful in the first attempt or try (e.g., as indicated by an acknowledgement of receipt) subsequent transmissions/receptions are not attempted to save power. In some embodiments, each hop of the route is given some measure of fault tolerance (e.g., n repeats) by allowing space in the frame for a repetition of transmission/reception between two nodes. The repetitions can be grouped into a batch of attempts. In some embodiments, the number of repeats in a batch is based on the stability of the communication between the two nodes.

A route from a first node to each other node in the mesh network including one or more intermediate nodes that receive and transmit the packet. A frame length used for communicating a packet based on the routes from the first node to each other node in the mesh network is selected. Node to node communications are selected within the frame along the route such that a low average communication latency time is achieved.

In some embodiments, frame construction provides for some retry per hop within a frame, but in general makes the frame shorter (long enough to cover each hop) with a goal of reducing or, in some cases, minimizing average latency. Latency, however, in this case is not well bounded because retry attempts can be either in a frame or in subsequent cycles of the frame. If many retries or transmission/reception attempts are necessary, latency can be long.

FIG. 1 is a block diagram illustrating an embodiment of a mesh network. In the example shown, mesh network 104 can communicate with network 100. Network 100 is a communication network and may be a local area network, a wide area network, the Internet, a wired network, a wireless network, or any other appropriate communication network. Mesh network 104 includes gateway nodes and mesh network nodes. Gateway nodes are represented in FIG. 1 as G 102 and G 106. The gateway node is able to communicate directly with a network—network 100 and network 108, respectively—and with mesh network nodes. For example, G 102 is able to directly communicate with N1, N2, and N3. The gateway node may also act as a mesh network coordinator sending to and receiving from the mesh network nodes information, configuration, status updates, etc. In some embodiments, there are multiple gateway nodes that can communicate with the same network (e.g., network 100) or one or more different networks. Mesh network nodes are represented in FIG. 1 as N1-N7. In some embodiments, mesh network nodes are sensor or device mesh network nodes. A mesh network node can communicate with other mesh network nodes and gateway nodes. For example, mesh network node N6 is able to communicate directly with mesh network node N5 and with gateway node G 106. In various embodiments, the connections allow communication only in one direction (i.e., to a node or from a node) or in both directions (i.e., both to and from a node).

In the example shown in FIG. 1, gateway and mesh network nodes communicate via radio transmitters and receivers using a packet. A packet may include a header section and a data section. The packet header may include information regarding packet type, time sent, source node, destination node, node health, number of tries for a hop, number of hops, etc. The packets are sent during defined time slots on defined frequencies using a time division multiple access (TDMA) methodology. In various embodiments, other methodologies for wireless or wired communications are used such as carrier sense multiple access (CSMA), code division multiple access (CDMA), global system for mobile communication (GSM), Transmission Control Protocol/Internet Protocol (TCP/IP), or any other appropriate network communication methodologies.

Figure 2:
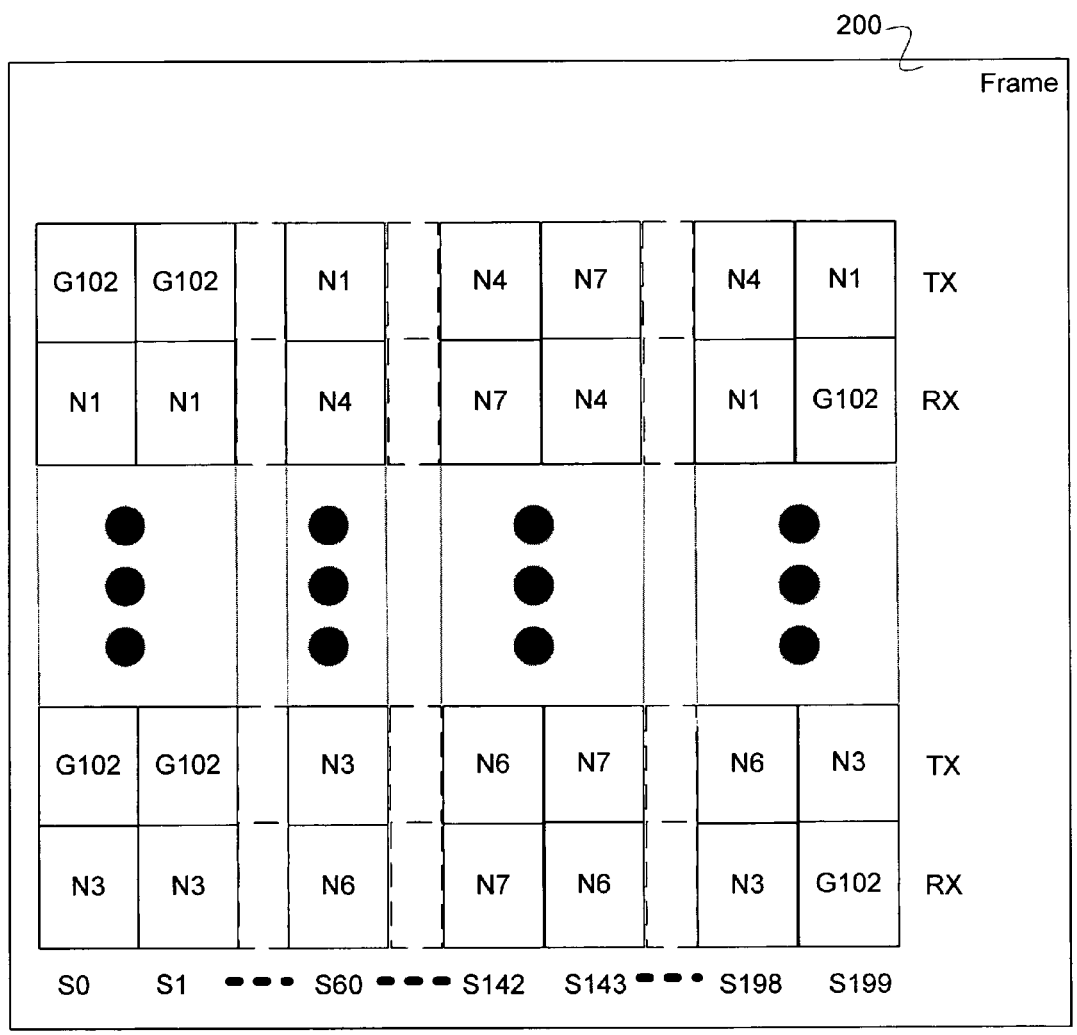
FIG. 2 is a block diagram illustrating an embodiment of a frame.

FIG. 2 is a block diagram illustrating an embodiment of a frame. In the example shown, frame 200 includes time slots that can be used to designate a receiver and a transmitter. During the time slot a designated transmitter node transmits to a designated receiver node of a mesh network. In various embodiments, the frequency used for transmission and reception is fixed, is selected from a pool of frequencies, rotates in a fixed manner, is randomly assigned, or is assigned using any other appropriate manner of assigning frequency to a transmission and reception. In some embodiments, the frequency comprises a frequency in the ISM band from 902 MHZ to 928 MHz. Frame 200 is repeated after executing the transmissions/receptions for all of its time slots. The network can support several different frames either running at different times or running concurrently. Some frames have only a few slots some have many slots depending on their design. Frame 200 contains 200 time slots (represented by S0, S1, S60, S142, S143, S198, and S199). Transmission links in the mesh network are assigned cells in a frame during which they can communicate. The transmissions and receptions for the frame are represented by designating a transmitter and a receiver for a given time slot. In S0 and S1, gateway G102 sends to node N1 and separately to N3. In S60, node N1 sends to node N4, and node N3 sends to node N6. In S142, node N4 sends to node N7, and node N6 sends to node N7. In S143, node N7 sends to node N4, and node N7 sends to N4. In S198, node N4 sends to node N1, and node N6 sends to node N3. In S199, node N1 sends to gateway G102, and node N3 sends to gateway G102. Nodes in the mesh network are activated along a given branch of the network—only activating portions of the frame—so that a given node only sends to or receives from one other node in the mesh network.

Figure 3:
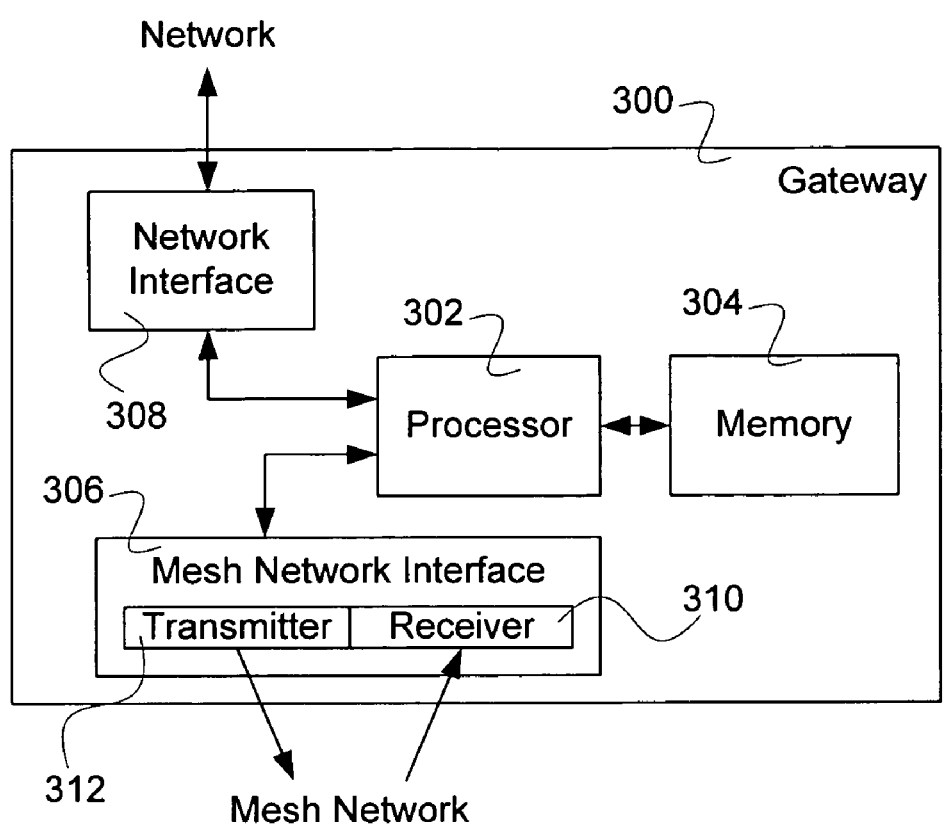
FIG. 3 is a block diagram illustrating an embodiment of a gateway of a mesh network.

FIG. 3 is a block diagram illustrating an embodiment of a gateway of a mesh network. In some embodiments, the gateway 300 of FIG. 3 is used to implement G 102 and/or G 106 in FIG. 1. In the example shown, gateway 300 includes processor 302, memory 304, mesh network interface 306, and network interface 308. Processor 302 runs software that when executed manages the mesh network. Management of the mesh network can include network setup, adding nodes, removing nodes, adding frames to the network, removing frames, monitoring status, optimizing network performance by reconfiguring frames, time synchronization, and/or any other appropriate network management function. Memory 304 provides storage for processor 302 including run-time storage and instruction storage. Mesh network interface 306 includes receiver 310 and transmitter 312. Receiver 310 receives communications in the form of packets transmitted from the mesh network. Transmitter 312 transmits communications in the form of packets to the mesh network. Network interface 308 communicates with a communication network comprising of one or more devices. Information from the mesh network is passed directly to or processed by gateway 300 using processor 302 before passing to the communication network. In some embodiments, gateway 300 is line powered so that power limitations due to finite battery reserves are not an issue. In various embodiments, network management is accomplished by a remote application or is coordinated by a node in the network.

Figure 4:
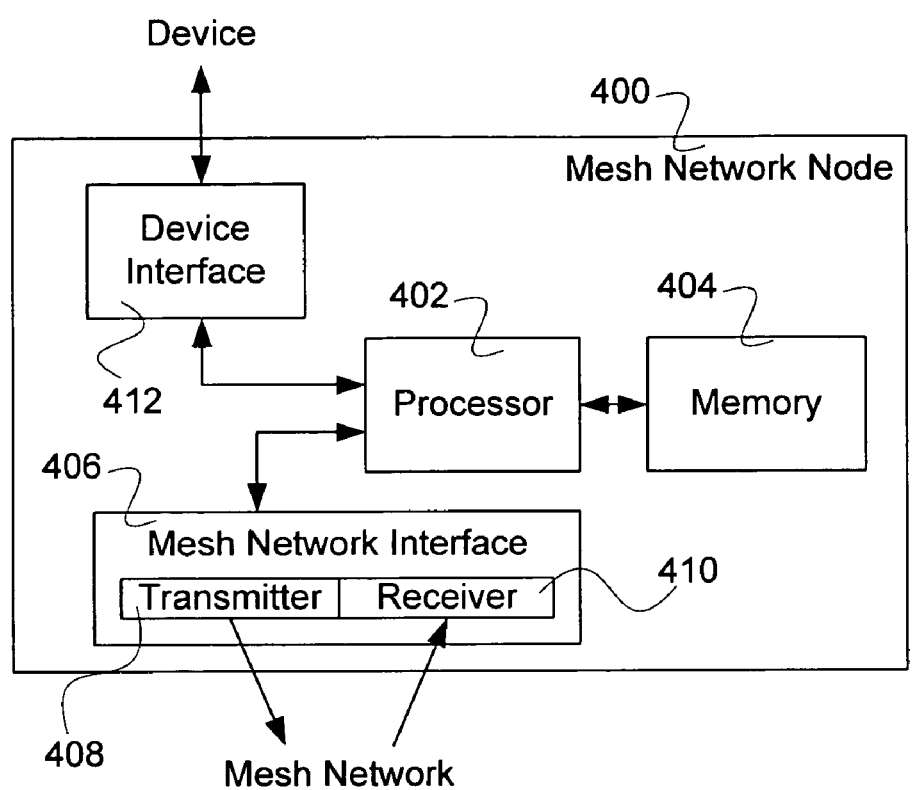
FIG. 4 is a block diagram illustrating an embodiment of a mesh network node of a mesh network.

FIG. 4 is a block diagram illustrating an embodiment of a mesh network node of a mesh network. In some embodiments, the mesh network node 400 of FIG. 4 is used to implement nodes N1-N7 in FIG. 1. In the example shown, mesh network node 400 includes processor 402, memory 404, mesh network interface 406, and device interface 412. Processor 402 runs software that when executed operates the mesh network node. Operation of the mesh network node can include setup, receiving messages, transmitting messages, adding capacity, removing capacity, providing status reports to a gateway manager such as gateway 300 in FIG. 3, time synchronization, and/or any other appropriate operating function. Memory 404 provides storage for processor 402 including run-time storage and instruction storage. Mesh network interface 406 includes receiver 410 and transmitter 408. Receiver 410 receives communications in the form of packets transmitted from the mesh network. Transmitter 408 transmits communications in the form of packets to the mesh network. In some embodiments, mesh network node 400 is usually battery powered so that power limitations due to finite battery reserves are an issue. Device interface 412 communicates with a device and/or sensor. Device and/or sensor types that can be connected to mesh network node include temperature sensors, strain sensors, image sensors, vibration sensors, fluid level sensors, chemical sensors, gas sensors, radiation detectors, position sensors, acceleration sensors, inclination sensors, shock sensors, infrared sensors, sound sensors, current sensors, voltage sensors, switching device, actuator device, or any other appropriate device and/or sensor. Information to/from the sensor and/or device is passed directly to or processed by sensor mesh network node 400 using processor 402 before passing from/to the mesh network.

Figure 5:
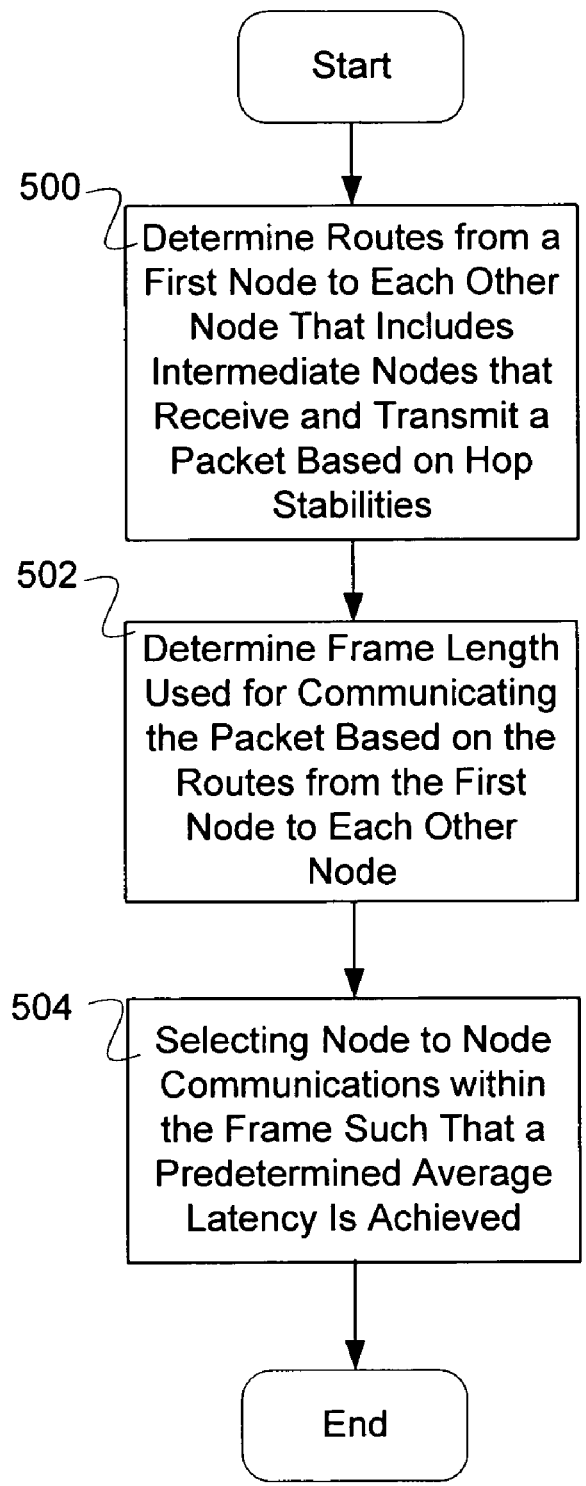
FIG. 5 is a flow diagram illustrating a process for communicating using a wireless mesh network.

FIG. 5 is a flow diagram illustrating a process for communicating using a wireless mesh network. In some embodiments, the process of FIG. 5 is used to designate a frame such as frame 200 of FIG. 2. In the example shown, in 500 routes from a first node to each other node in the mesh network are determined, where the routes include intermediate nodes that receive and transmit a packet based on hop stabilities. Each route is a series of hops in which a packet is transmitted from one node and received by another node enabling the packet to be transmitted from a desired source node to a destination node by passing through a series of intermediate nodes. In 502, a frame length used for communicating the packet based on the routes from the first node to each other node is determined. In the case that all hop stabilities are the same, the frame length can be determined by counting the maximum number of hops between any given node and any given other node in the network and multiplying by a factor of n. In the case where the stabilities are not the same within the network, the maximum expected number of transmissions can be counted between any given node and any given other node in the network. In 504, node to node communications within the frame are selected such that a predetermined average latency is achieved. In some cases, the predetermined average latency can be achieved by making the frame slightly shorter than the predetermined average latency quality of service specification. If the network rarely drops a packet and if the measured communication from a source node to a destination node can be achieved in one frame, then the typical latency for a packet will be slightly shorter than the predetermined average latency specification. For example, transmitting from a source node to an intermediate node in slot 1 of the frame and from the intermediate node to a destination node in slot 2. In some embodiments, all transmissions and receptions for a given hop of a tree of routes from one node to all other nodes in the network are selected to be in the same slot of a frame. In some embodiments, all transmissions and receptions for a subsequent hop of a tree of routes from one node to all other nodes in the network are selected to be in a subsequent slot of a frame.

Figure 6:
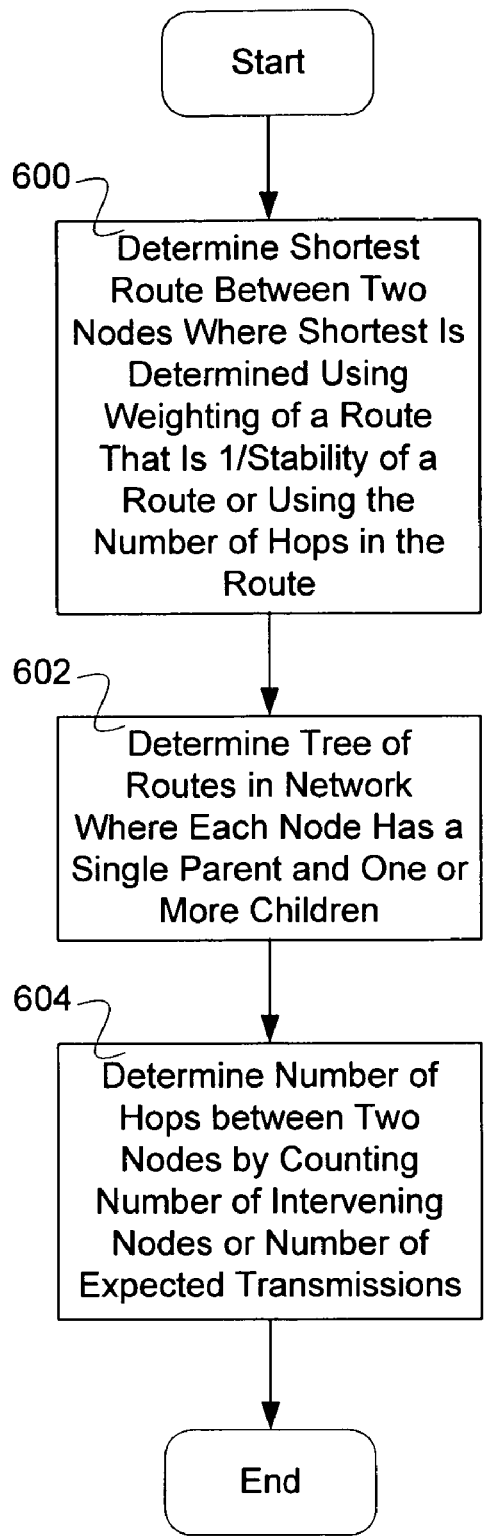
FIG. 6 is a flow diagram illustrating an embodiment of a process for determining routes in a mesh network.

FIG. 6 is a flow diagram illustrating an embodiment of a process for determining routes in a mesh network. In some embodiments, the process of FIG. 6 is used to implement 500 in FIG. 5. In the example shown, in 600 the shortest route between two nodes is determined using a weighting of a route that is inversely proportional to the stability of a route or using the number of hops in the route. In 602, a tree of routes is determined in the mesh network where each node has one parent node and one or more children. In 604, the number of hops between two nodes is determined based on counting the number of intervening nodes or the number of expected transmissions to transmit a packet between the two nodes.

Figure 7:
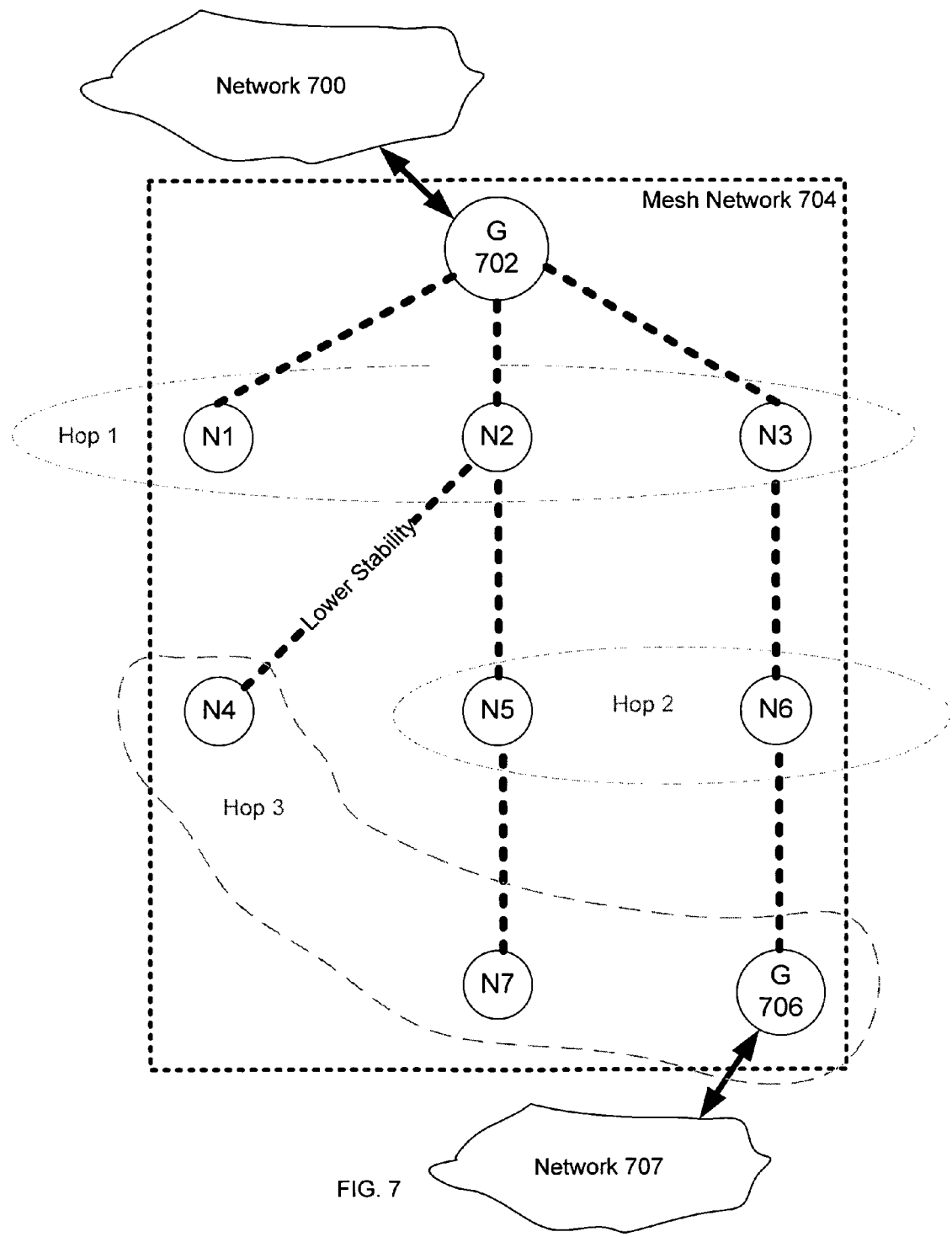
FIG. 7 is a block diagram illustrating an embodiment of a mesh network.

FIG. 7 is a block diagram illustrating an embodiment of a mesh network. In some embodiments, mesh network 704 and the designated tree of hops and routes are a result of the process of FIG. 6. In the example shown, mesh network 704 includes nodes G702, N1, N2, N3, N4, N5, N6, N7, and7. Gateway node G702 can communicate with network 700 and with nodes N1, N2, and N3. Nodes N1, N2, and N3 are along routes that are 1 hop away from gateway node G702. Nodes N5 and N6 are along routes that are 2 hops away from gateway node G702. The route to N5 from G702 is first hop to N2 and then to N5. The route to N6 from G702 is first hop to N3 and then to N6. Nodes N4, N7, and G706 are along routes that are 3 hops away from gateway node G702. The route to N7 from G702 is first hop to N2, then to N5, and then to N7. The route to G706 is first hop to N3, then to N6, and then to G706. Gateway G706 can communicate with network 708. Node N4 is considered to be 3 hops from gateway G702. The route to node N4 is to first hop to N2 and then to N4. The last hop from N2 to N4 is counted as 2 hops as the expected number of transmissions given the lower stability of communications from N2 to N4 is two transmissions. In some embodiments, expected transmissions are not considered and the intervening number of nodes is considered—similar to a situation where all node to node communications have the same number of expected transmissions and the number of expected transmissions is 1.

Figure 8:
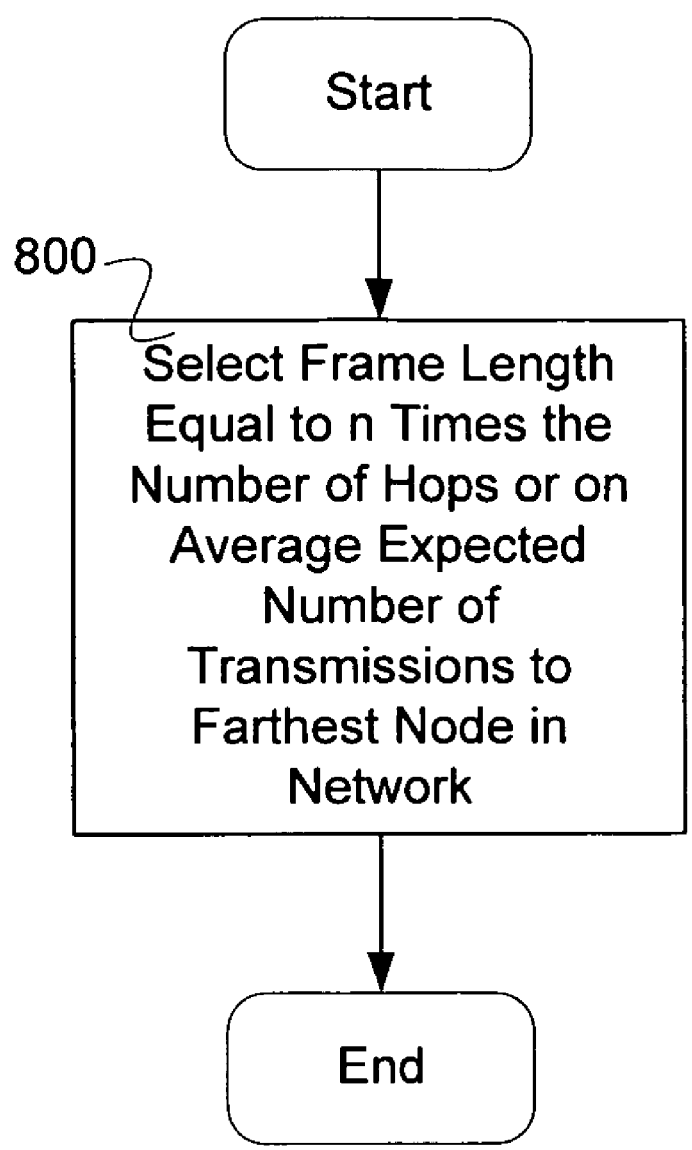
FIG. 8 is a flow diagram illustrating an embodiment of a process for selecting frame length.

FIG. 8 is a flow diagram illustrating an embodiment of a process for selecting frame length. In some embodiments, the process of FIG. 8 is used to implement 502 of FIG. 5. In the example shown, a frame length is selected equal to n times the number of hops or on average expected number of transmissions to the farthest node in the network. For example, there are on average 8 expected transmissions from source node to the farthest node in the network, so the frame length is selected to be n*8. In various embodiments, n is 1 or 2. In the case where n is 1, then the hop or expected transmission is attempted only once; the frame length has been chosen such that if any transmission fails, then the packet transmission must be completed in the next iteration of the frame. If all transmissions succeed, then a fast packet trip from the source node to the farthest (or other destination) node is achieved. In the case where n is 2, then the hop or expected transmission can be attempted twice in the frame; if the transmissions succeed within the allotted two transmissions then the packet trip is completed within one frame. In some embodiments, with n equal to 2, only one attempt is listed within the frame for each of the hop communications and the next slot is left blank. In the case of n, the hop of expected transmission can be attempted n times in the frame; the frame is longer as n increases and the certainty of the transmission being successfully received in a given hop increases as the number n increases. If the frame is longer, then the average latency or travel time for a packet from a source node to a destination node is longer.

Figure 9:
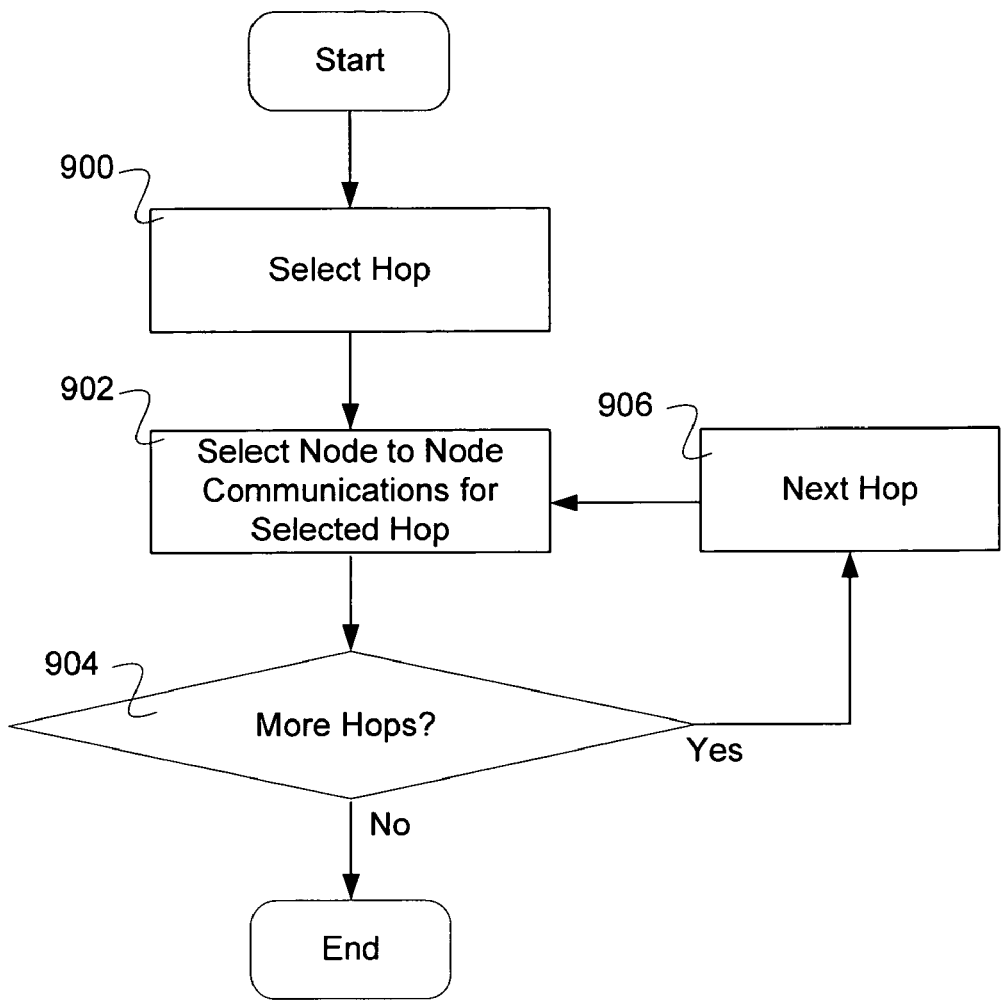
FIG. 9 is a flow diagram illustrating an embodiment of a process for selecting node to node communications.

FIG. 9 is a flow diagram illustrating an embodiment of a process for selecting node to node communications. In some embodiments, the process of FIG. 9 is used to implement 504 of FIG. 5. In the example shown, in 900 a hop is selected. In 902, node to node communications are selected for the selected hop. For example, for hop one the node to node transmitter/receiver pairs are designated in a given slot of the frame. In 904, it is determined if there are more hops. If there are more hops, then in 906 the next hop is selected and control passes to 902. If there are no more hops to specify, then the process ends.

Figure 10:
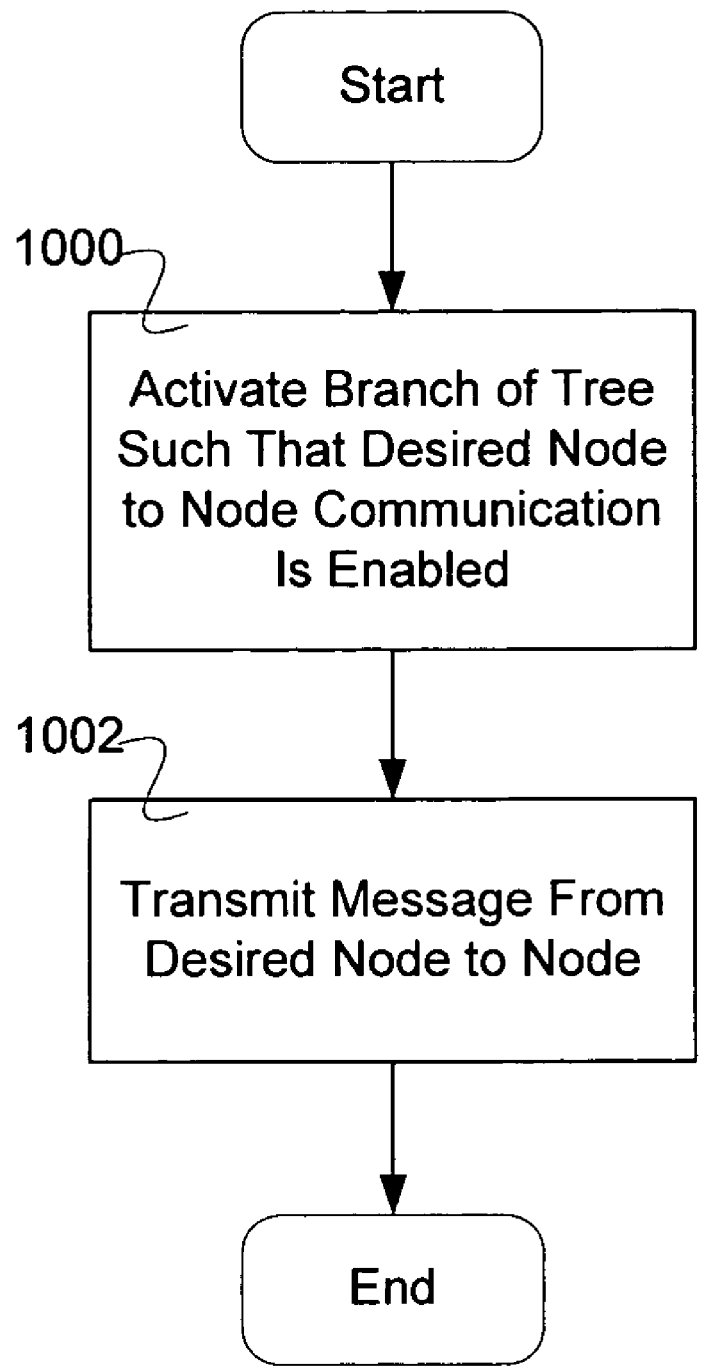
FIG. 10 is a flow diagram illustrating an embodiment of a process for activating a route.

FIG. 10 is a flow diagram illustrating an embodiment of a process for activating a route. In some embodiments, the process of FIG. 10 is used to selectively activate nodes along a route described in a frame. In the example shown, in 1000 a branch of the tree is activated such that communication from a desired node to node is enabled. For example, communication is desired from a source node to a destination node with intermediate node 1 and intermediate node 2; Source node to destination route is turned on by sending a packet on the route from source node to destination node (via intermediate nodes 1 and 2) within the frame. Other nodes in the network are not activated by the packet sent along the desired route, so that within the frame only the desired route is active. In 1002, a message is transmitted from desired node to node. One or more packets are sent from source node to destination node using activated route within the frame.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for communicating using a wireless mesh network, comprising:

determining a plurality of routes from a first node to each other node in the wireless mesh network including one or more intermediate nodes that receive and transmit the packet;

selecting a frame length used for communicating a packet based on the plurality of routes from the first node to each other node in the wireless mesh network; and selecting node to node communications within the frame along one or more routes of the plurality of routes such that a predetermined average communication latency time is achieved, wherein the low average communication latency time is achieved using a predetermined number of retries of a communication between two nodes that are part of a communication route between the first node and the second node, wherein the predetermined number of retires is based at least in part on a stability of a node to node communication, and wherein selecting node to node communications includes selecting node to node communications for two or more routes from a parent node, wherein the frame comprises a matrix of time slots and channels, wherein the frame repeats in a cycle, wherein a channel associated with a particular link in the frame changes from frame to frame within the cycle according to a predefined sequence, wherein node to node communications in at least one route from the first node to a second node in the wireless mesh network is selected such that the first node communicates to an intermediate node in a first time slot of the frame and the intermediate node communicates to a third node in a second time slot of the frame, wherein the second time slot in the frame is subsequent in time to the first time slot in the frame.

2. A method as in claim 1, wherein the low average communication latency time is achieved using a predetermined number of retries of a communication between two nodes that are part of a communication route between the first node and the second node.

3. A method as in claim 2, wherein the predetermined number of retires is based at least in part on a stability of a node to node communication.

4. A method as in claim 1, wherein the second node is farther from a gateway node than the first node.

5. A method as in claim 1, wherein the low average communication latency time is achieved at least in part by selecting the route that reduces a maximum route length between the first node and the second node in network.

6. A method as in claim 1, wherein the low average communication latency time is achieved at least in part by selecting the route that reduces an expected number of transmissions along the route from the first node and the second node in network.

7. A method as in claim 1, wherein the frame length is equal to n times the maximum number of hops from the first node to each other node.

8. A method as in claim 7, wherein n equals 1.

9. A method as in claim 7, wherein n equals 2.

10. A method as in claim 1, wherein the frame length is equal to n times the maximum number of expected transmissions from the first node to each other node.

11. A method as in claim 10, wherein n equals 1.

12. A method as in claim 10, wherein n equals 2.

13. A method as in claim 1, wherein the node to node communications within the frame are selected such that in one frame a message can get from the first node to each other node.

14. A method as in claim 1, wherein the node to node communications within the frame are selected such that there are batches of communications along each of the paths wherein each batch includes attempts of a predetermined node to node communication.

15. A method as in claim 1, further comprising activating a node in a route from the first node to a second node to use the frame for communicating by sending a source routed packet along the route.

16. A method as in claim 1, further comprising receiving an acknowledgement that a prior node to node communication was successfully received and not transmitting a communication retry based on receiving the acknowledgement.

17. A method as in claim 1, further comprising sending an acknowledgement that a prior node to node communication was successfully received and not receiving during a communication retry based on sending the acknowledgement.

18. A system for communicating using a wireless mesh network, comprising:
 a processor; and
 a memory coupled with the processor, wherein the memory is configured to provide the processor with instructions which when executed cause the processor to:
 determine a plurality of routes from a first node to each other node in the wireless mesh network including one or more intermediate nodes that receive and transmit the packet;
 select a frame length used for communicating a packet based on the plurality of routes from the first node to each other node in the wireless mesh network; and
 select node to node communications within the frame along one or more routes of the plurality of routes such that a predetermined average communication latency time is achieved, wherein the low average communication latency time is achieved using a predetermined number of retries of a communication between two nodes that are part of a communication route between the first node and the second node, wherein the predetermined number of retires is based at least in part on a stability of a node to node communication, and wherein selecting node to node communications includes selecting node to node communications for two or more routes from a parent node, wherein the frame comprises a matrix of time slots and channels, wherein the frame repeats in a cycle, wherein a channel associated with a particular link in the frame changes from frame to frame within the cycle according to a predefined sequence, wherein node to node communications in at least one route from the first node to a second node in the wireless mesh network is selected such that the first node communicates to an intermediate node in a first time slot of the frame and the intermediate node communicates to a third node in a second time slot of the frame, wherein the second time slot in the frame is subsequent in time to the first time slot in the frame.

19. A computer program product for communicating using a wireless mesh network, the computer program product being embodied in a non-transitory computer readable medium encoded with computer executable instructions for: determining a route from a first node to each other node in the wireless mesh network including one or more intermediate nodes that receive and transmit the packet; selecting a frame length used for communicating a packet based on the routes from the first node to each other node in the wireless mesh network; and selecting node to node communications within the frame along one or more routes of the plurality of routes such that a predetermined average communication latency time is achieved, wherein the low average communication latency time is achieved using a predetermined number of retries of a communication between two nodes that are part of a communication route between the first node and the second node, wherein the predetermined number of retires is based at least in part on a stability of a node to node communication, and wherein selecting node to node communications includes selecting node to node communications for two or more routes from a parent node, wherein the frame comprises a matrix of time slots and channels, wherein the frame repeats in a cycle, wherein a channel associated with a particular link in the frame changes from frame to frame within the cycle according to a predefined sequence, wherein node to node communications in at least one route from the first node to a second node in the wireless mesh network is selected such that the first node communicates to an intermediate node in a first time slot of the frame and the intermediate node communicates to a third node in a second time slot of the frame, wherein the second time slot in the frame is subsequent in time to the first time slot in the frame.

* * * * *